Oct. 10, 1950     F. G. DAMUTH     2,525,096

METHOD FOR PRESERVING EGGS

Filed May 20, 1946

INVENTOR.
Fred G. Damuth
BY C. G. Stratton
ATTORNEY

Patented Oct. 10, 1950

2,525,096

UNITED STATES PATENT OFFICE 2,525,096

METHOD FOR PRESERVING EGGS

Fred G. Damuth, Carlsbad, Calif., assignor to Carlos G. Stratton, Los Angeles, Calif.

Application May 20, 1946, Serial No. 670,943

6 Claims. (Cl. 99—196)

This invention relates to the preservation of perishable materials, such as foods, and it has especial reference to means for and method of packaging eggs to preserve them in their original state against decomposition, deterioration, and desiccation and render them available at any time when a fresh egg is required for use.

Eggs in the shell are frequently kept for a long time, and for a much longer time in cold storage or under preserving fluids, until released according to market requirements. So consigned to keeping, it is impossible to determine the condition of an egg, that is, whether it is fresh when deposited for storage, or whether it has already undergone initial or advanced decomposition. Assuming that the eggs are fresh when stored, long periods of storage under any condition or in any fluid, destroys the flavor and appearance of the eggs when removed from the shell and renders them distasteful even when consumed with the accompaniment of other foods.

In addition, storage of eggs as now practiced requires much space and is attended by a heavy breakage percentage and the not inconsiderable cost of crates and the labor incident on the packing and storing.

The primary object of this invention is to make fresh eggs available for use whenever required, to preserve the flavor and appearance of the fresh egg and to afford a view of the egg to be used.

Another object of the invention is to provide a means by which none but fresh eggs are prepared for storage and subsequent use and in which the quality or freshness of the egg may be predetermined before packaging for storage.

Still another object of the invention is to provide a means for storing fresh eggs which will obviate the loss of eggs by breakage, eliminate the need for crates and other storage facilities, and reduce to a minimum the expense connected with the handling of eggs in the shell.

My invention also has for its objects to provide such means for the preservation of fresh eggs, that are convenient in use, readily handled, economical, relatively simple, and of superior serviceability.

The invention also comprises novel details of construction and steps of procedure which will more fully appear in the course of the following description. However, the drawing merely shows and the following description merely describes one embodiment of the present invention, which is given by way of illustration or example only.

In the drawing, like reference characters designate similar parts in the several views.

Figure 1:
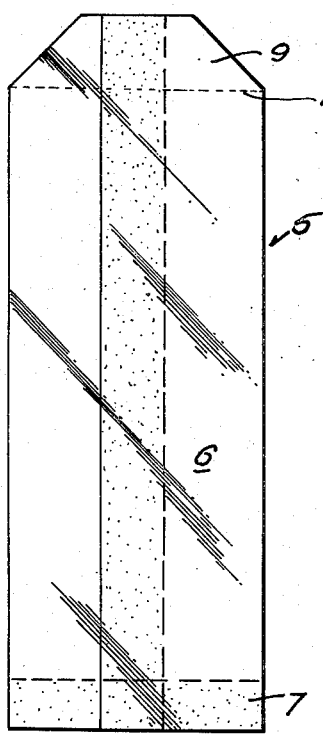
Fig. 1 is an elevational view showing a container embodying my invention.
Figure 2:
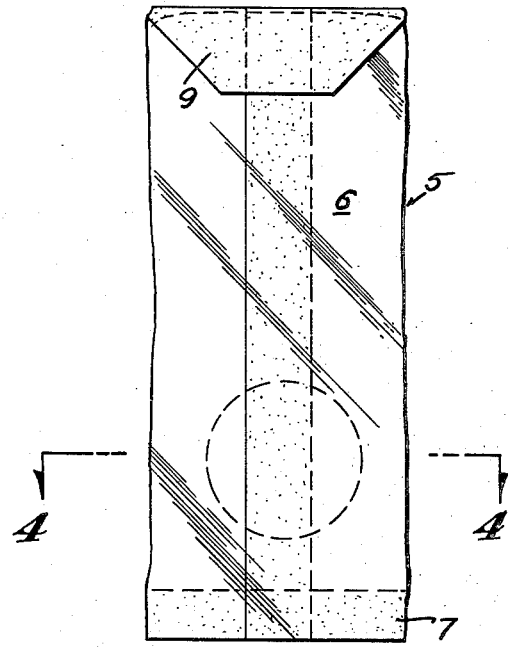
Fig. 2 is a similar view showing the container supplied with its content and the seal flaps folded upon the container.
Figure 3:
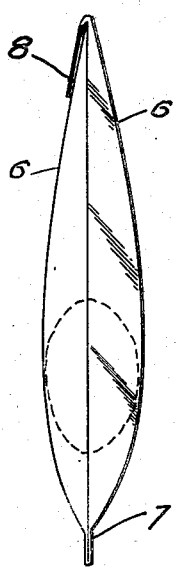
Fig. 3 is a side view of Fig. 2.
Figure 4:
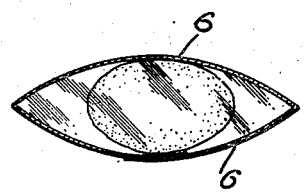
Fig. 4 is a section on line 4—4 of Fig. 2, viewed in the direction of the arrow.

The principal thought involved in the present invention is to protect an egg when removed from its shell from the oxidizing effect of air by enclosing the egg in an area devoid of oxygen and sealing the area. The egg thus encased may be deep frozen and thus preserved in its original freshness for an indefinite period. To this end, the egg, removed from its shell, is placed in a case, container or envelope 5 of a size generally sufficient to accommodate but one egg, which is calculated to fill the case or container to capacity and thereby displace the air therein. Since eggs are not always uniform in cubical content, cases or containers of various sizes may be provided, the important consideration being that the egg completely fill the case.

The case is a substantially rectangular body as shown, though other forms may be used. It is composed of transparent, impervious, and relatively tough material, such as cellophane or any other of the well known materials. The case 5 comprises normally opposed flat walls 6, a closed bottom 7 and an open top 8. From the top of each wall 6 is extended a flap 9, the respective flaps being in parallel alignment and provided on the inside faces thereof with a coating of cement or adhesive material that is preferably inactive except under the influence of heat, essentially to prevent adherence of the flaps to each other when stored or not in use. These flaps 9 are creased as at 10 on a line substantially parallel with the top of the case to enable them to be readily and conveniently folded onto a side of the case, to which they may be secured, as by cement.

In use the case 5 is opened and a fresh egg, removed from the shell, is deposited within it, the interior area of the case being so dimensioned that the egg fills the case to practical capacity, that is, to or very slightly below the top thereof, which is the crease line for the flaps. The albuminous part of the egg, however, must not rise above the top of the case though it may be substantially on a level with it, and this for the reason that any albuminous portion that may have entered between the extended flaps, to whatever extent it may be, will be congealed when the flaps are cemented together by the action of heat. For this reason, it is preferred that the level of the egg substance be slightly below the top of the case so that the eventual union of the two flaps will seal the egg in an area devoid of air. By manipulation of the sides of the case that are bulged by the product therein, the egg may be caused completely to fill the case and displace all except a minute portion of air at the top of the case. When this is accomplished, the flaps are cemented together in any desirable manner, but preferably by heat and pressure applied as through the medium of an iron or other press. The joined flaps 9 are then folded on the line of the crease 10 onto a side of the filled case 5 to which they may be cemented, thereby to increase the efficacy of the seal.

It will be observed that each egg of a quantity is contained and sealed in a separate case or envelope and that when so sealed, the cases are readily handled by the flaps 9, which obviously may be free or just laid over a side in loose manner. This is an advantage for the reason that in this wise the body of the case with the egg therein is never touched by human hands and hence the egg does not absorb warmth or heat that might affect it. The eggs, encased as described, are then subjected to what is known as a deep-freezing process, and in this condition of freeze, they may be kept for prolonged periods, without losing flavor or color or consistency, characterizing a fresh egg. When withdrawn from the freeze chamber or compartment for use, the case is readily opened for removal of the egg therefrom. While I have herein referred to and described a case or container for use in storing and deep-freezing eggs, it will be understood that the albuminous portion of the egg alone or any other gelatinous or colloidal product may be so encased for preservation.

While I have illustrated and described what I now regard as the preferred embodiment of my invention, the construction, combination, steps and sequences of steps are, of course, subject to modifications without departing from the spirit and scope of my invention. I, therefore, do not wish to restrict myself to the particular form, steps or sequences of steps described hereinbefore, but desire to avail myself of all modifications that may fall within the scope of the appended claims.

Having thus described my invention, what I claim and desire to secure by Letters Patent of the United States, is:

1. The method of preserving a fresh egg which consists in the steps of breaking the egg into a transparent and impervious container having a neck, whereby the condition of the egg can be visually determined at that time and at any subsequent time before removal of the egg from the container, expelling any air there may be in the container by manipulation of the walls of the container to raise the egg up into the neck of the container and in substantially air-tight engagement with the neck, and simultaneously expelling the air from the container hermetically sealing the container, and deep-freezing the egg-containing container.

2. The method of preserving a fresh egg which consists in the steps of breaking the egg into a transparent readily flexible and impervious container whereby the condition of the egg can be visually determined at that time and at any subsequent time before removal of the egg from the container, pressing together the flexible sides of the container in a manner to cause the egg to substantially fill the same to the exclusion of air, hermetically sealing the open end of the container while the sides thereof are under said compression, and deep-freezing the egg-containing container.

3. The method of preserving a fresh egg which consists in the steps of breaking the egg into a transparent readily flexible and impervious rectangular container having opposed sides, whereby the condition of the egg can be visually determined at that time and at any subsequent time by inspection through said transparent sides, pressing together said sides to spread the egg throughout the container without disturbing the yolk to displace air therefrom and to bring the liquid albumen of the egg along a line approximately at the sealing line of the container, hermetically sealing along said line by heat and pressure and deep-freezing the egg-containing container.

4. The method of preserving a fresh egg which consists in the steps of breaking the egg into a readily flexible and impervious and transparent container of rectangular form and having opposed sides, pressing together said sides to spread the egg throughout the container without disturbing the yolk, to exclude air therefrom and to bring the liquid albumen of the egg along a line approximately at the sealing line of the container, hermetically sealing along said line by heat and pressure, and deep-freezing the egg-containing container.

5. The method of preserving fresh a fresh egg in storage, which consists in removing a fresh egg from its shell, in placing the single egg so removed in a transparent, flexible case of impervious material, said case having a mouth and having at least a capacity equal to the mass of the egg, and affording a view of the egg at all times, pressing the sides of the case to spread the egg therein to the mouth of the case, to expel the air therefrom, hermetically sealing the case while the sides are pressed, and then deep-freezing the egg-containing case.

6. The method of preserving a fresh egg in storage, which consists in removing the egg from its shell in an unbroken condition, placing the single egg without its shell in a transparent, flexible case of impervious material, said case having an open end and a capacity substantially equal to the mass of the egg, pressing the sides of the case to urge the egg contained therein upwardly towards the open end to discharge any air which may be contained therein out of the case, hermetically sealing the case while the egg is in its upper position and the air is removed therefrom, and then deep-freezing the egg while in its case.

FRED G. DAMUTH.

REFERENCES CITED

The following references are of record in the file of this patent:

UNITED STATES PATENTS

| Number | Name | Date |
|---|---|---|
| 969,954 | Holmes | Sept. 13, 1910 |
| 1,015,708 | Pichon | Jan. 23, 1912 |
| 1,398,860 | Hussey | Nov. 29, 1921 |
| 1,932,721 | Benoit | Oct. 31, 1933 |
| 2,114,195 | Teichner | Apr. 2, 1938 |
| 2,160,604 | Stamper | May 30, 1939 |
| 2,340,260 | Clunan | Jan. 25, 1944 |
| 2,354,590 | Gilfillan et al. | July 25, 1944 |
| 2,369,765 | Waters | Feb. 20, 1945 |
| 2,496,755 | Schwartzberg | Feb. 7, 1950 |

FOREIGN PATENTS

| Number | Country | Date |
|---|---|---|
| 346,031 | Great Britain | Apr. 1, 1931 |
| 435,242 | Great Britain | Sept. 17, 1935 |

OTHER REFERENCES

"Food Industries," May 1943, pages 67 and 68, article entitled "How To Produce Frozen Eggs That The Housewife Can Use."

"The Freezing Preservation of Foods," 1947 by Tressler and Evers, published by The Avi Publishing Company, Inc., pages 634–637.